United States Patent
Yu et al.

(10) Patent No.: US 9,777,099 B2
(45) Date of Patent: Oct. 3, 2017

(54) FLUORINE-CONTAINING POLYMER MICROSPHERE

(71) Applicants: SHANGHAI WEIKAI OPTOELECTRONICS NEW MATERIALS CO., LTD., Shanghai (CN); SHANGHAI CHENGYING NEW MATERIALS CO., LTD, Shanghai (CN)

(72) Inventors: Mingdong Yu, Shanghai (CN); Huiya Yuan, Shanghai (CN)

(73) Assignees: SHANGHAI WEIKAI OPTOELECTRONICS NEW MATERIALS CO., LTD., Shanghai (CN); SHANGHAI CHENGYING NEW MATERIALS CO., LTD, Shanghai (CN)

( * ) Notice: Subject to any disclaimer, the term of this patent is extended or adjusted under 35 U.S.C. 154(b) by 55 days.

(21) Appl. No.: 14/766,133

(22) PCT Filed: Mar. 15, 2013

(86) PCT No.: PCT/CN2013/072668
§ 371 (c)(1),
(2) Date: Aug. 5, 2015

(87) PCT Pub. No.: WO2014/121542
PCT Pub. Date: Aug. 14, 2014

(65) Prior Publication Data
US 2015/0368390 A1    Dec. 24, 2015

(30) Foreign Application Priority Data
Feb. 6, 2013    (CN) .......................... 2013 1 0047973

(51) Int. Cl.
*C08F 2/00*    (2006.01)
*C08F 20/06*    (2006.01)
(Continued)

(52) U.S. Cl.
CPC .............. *C08F 265/06* (2013.01); *C08F 2/48* (2013.01); *C08F 220/24* (2013.01);
(Continued)

(58) Field of Classification Search
CPC .. C08F 265/06; C08F 293/005; C08F 220/24; C08F 2/48; C08F 2438/03; C09D 7/12; Y10T 428/2982
(Continued)

(56) References Cited

U.S. PATENT DOCUMENTS

| 6,593,439 B1 * | 7/2003 | Christian ................. C08F 2/06 525/276 |
| 2007/0059628 A1 * | 3/2007 | Tanaka ..................... C08F 2/04 430/110.4 |

FOREIGN PATENT DOCUMENTS

| CN | 1817922 A | 8/2006 |
| CN | 101070361 A | 11/2007 |

(Continued)

OTHER PUBLICATIONS

International Search Report of PCT/CN2013/072668.
(Continued)

*Primary Examiner* — William Cheung
(74) *Attorney, Agent, or Firm* — Kam W. Law; Squire Patton Boggs (US) LLP

(57) ABSTRACT

Disclosed in the invention is a fluorine-containing polymer microsphere. A polymerization monomer, a photoinitiator and a stable dispersant are added into a reaction kettle, carbon dioxide gas is introduced for emptying air therein,
(Continued)

then liquid carbon dioxide is injected, an initiating light source is used for irradiating in the reaction kettle after the temperature and pressure of the reaction kettle are constant, the reaction is performed under the conditions of −20-30° C. and 20-70 bar, wherein the concentration of the polymerization monomer accounting for the total volume of the reactants is 0.02-2 g/ml, and the weight ratio of the photoinitiator, stable dispersant and polymerization monomer is (0.3-10):(2-20):100; after the reaction is finished, the temperature returns to room temperature, and the precipitate is washed with liquid carbon dioxide, so as to obtain the polymer microspheres. The fluorine-containing polymer which covers the surface of the microspheres in the present invention can reduce the surface energy thereof, and can benefit the timely migration of the microspheres to the coating surface; a tertiary amine group is introduced into the fluorine-containing polymer to firmly bond the microspheres into a cross-linked network, and thus benefits the tight integration of the microspheres and the coating; a RAFT active group is introduced to firmly anchor the microspheres onto the coating film; thus ensuring the stability of the cured coating.

10 Claims, 2 Drawing Sheets

(51) Int. Cl.
| | | |
|---|---|---|
| *C08F 118/02* | (2006.01) | |
| *C08F 20/44* | (2006.01) | |
| *C08F 265/06* | (2006.01) | |
| *C08F 2/48* | (2006.01) | |
| *C09D 7/12* | (2006.01) | |
| *C08F 293/00* | (2006.01) | |
| *C08F 220/24* | (2006.01) | |

(52) U.S. Cl.
CPC ............ *C08F 293/005* (2013.01); *C09D 7/12* (2013.01); *C08F 2438/03* (2013.01); *Y10T 428/2982* (2015.01)

(58) Field of Classification Search
USPC .............................. 526/222, 341, 319, 317.1
See application file for complete search history.

(56) References Cited

FOREIGN PATENT DOCUMENTS

| | | |
|---|---|---|
| CN | 101591406 A | 12/2009 |
| CN | 103130969 A | 6/2013 |

OTHER PUBLICATIONS

SunChong, Synthesis of Amphiphilic Fluorinated Copolymers and Impacts of Ionic Concentration on Self-assemble Behavior, Wuhan University of Technology, master's degree thesis, 2012.
Masanori Kobayashi et al., Dispersion Polymerization of Vinyl Monomers in Supercritical Carbon Dioxide, 2002, 75(8), 371-377.
Search Report of JP2015-555537, 2015.
English translation of Search Report of JP2015-555537, 2015.
Office Action of JP2015-555537, 2015.
English translation of Office Action of JP2015-555537, 2015.

* cited by examiner

FLUORINE-CONTAINING POLYMER MICROSPHERE

CROSS-REFERENCE TO RELATED APPLICATIONS

This is a U.S. national stage application of the International Patent Application No. PCT/CN2013/072668, filed Mar. 15, 2013, which claims priority to Chinese Patent Application No. 201310047973.6, filed Feb. 6, 2013, both of which are incorporated herein by reference in their entireties.

FIELD OF INVENTION

The present invention relates generally to the field of polymer microsphere synthesis, and more particularly to a fluorine-containing polymer microsphere.

BACKGROUND

Polymer microspheres refer to high polymer materials or polymer composites in the geometric shape of a sphere or near-sphere with a diameter ranging from nanoscale to microscale. Polymer microspheres, due to their particular sizes and structures, have been playing a special and important role for a long time in areas such as electronic information, bio-medical technology, coating materials, etc.

In the coating area, besides its use for improving the coating property (mechanical property, electromagnetic property and so on), microspheres may also be used for adjusting the surface properties of coatings, such as optical properties including light extinction and light diffusion, abrasion resistance, scratch resistance, weather resistance, etc. In the application of photocurable coatings with high solid contents, due to rapid curing of the coatings, filling microspheres can hardly diffuse timely onto the surface of the coatings, often impairing their effect significantly.

Polymer microspheres may be synthesized by means of polymerization, such as emulsion polymerization, precipitation polymerization, dispersion polymerization, etc. These polymerization processes all need to be carried out in a reaction medium (for example, organic solvents like alcohols and ethers). Carbon dioxide fluid is a "green" solvent, having advantages of being non-toxic, environmental friendly, non-flammable, easily available at a low price, recyclable, etc. The use of carbon dioxide fluid in place of traditional organic solvents as a reaction medium for synthesizing polymers can greatly reduce emission of volatile organic compounds (VOC). Being used as the reaction medium for preparing polymer microspheres is an important application of carbon dioxide fluid, the research on which has made many significant progresses. However, the traditional polymerization reaction needs to be conducted under the condition of heating (e.g., 50° C. or higher), and the reaction temperature is higher than the critical temperature of carbon dioxide (31.3° C.). Therefore, carbon dioxide must be in a supercritical state, and accordingly, a higher reaction pressure (>200 bars) is generally required. The resulting high equipment cost and slow reaction process restrain actual application of carbon dioxide in preparing microspheres.

SUMMARY OF THE INVENTION

The present invention aims to cure the above deficiencies existing in the prior art and to provide a fluorine-containing polymer microsphere. This polymer microsphere is produced through photo-dispersion polymerization, with liquid carbon dioxide as a reaction medium and an RAFT (Reversible Addition-Fragmentation Chain Transfer) macromolecular chain, as a stabilizer, containing fluorine and a tertiary amine group. The fluorine-containing polymer covering the surface of the polymer microspheres according to the present invention can reduce the surface energy thereof, facilitating timely migration of the microspheres onto the coating surface; the tertiary amine groups introduced into the fluorine-containing polymer firmly bond microspheres into a cross-linked network, facilitating tight bonding of microspheres and coating; the RAFT active groups introduced further firmly anchor the microspheres onto the coating film; the three elements are combined together to ensure the stability of the cured coating.

The aim of the present invention is achieved by the following technical solutions.

The present invention relates to a fluorine-containing microsphere, which is prepared through the following steps.

A. A polymerizable monomer, a photoinitiator and a stabilizing dispersant containing fluorine are added in a reactor, and carbon dioxide gas is introduced into the reactor to eliminate air therein; liquid carbon dioxide is injected into the reactor, and after the temperature and pressure in the reactor become constant, an initiating light source is used to irradiate inside the reactor so as to carry out a photoinitiation reaction for 0.5-5 h at a temperature of −20 to 30° C. and under a pressure of 20-70 bars; the concentration of the polymerizable monomer is 0.02-2 g/ml relative to the total volume of the polymerizable monomer and the liquid carbon dioxide, and the weight ratio of the photoinitiator to the stabilizing dispersant to the polymerizable monomer is (0.3-10):(2-20):100;

B. After the reaction is over and the temperature in the reactor returns to room temperature, the polymers precipitated in the bottom of the reactor are washed with liquid carbon dioxide to remove the residual polymerizable monomer, thereby obtaining the polymer microsphere.

Preferably, the fluorine-containing stabilizing dispersant is obtained through a polymerization reaction of dodecafluoroheptyl methacrylate and dimethylaminoethyl methacrylate in the presence of a reversible addition-fragmentation chain transfer agent; and the weight ratio of dodecafluoroheptyl methacrylate to dimethylaminoethyl methacrylate is 40:60-99:1.

Further preferably, the reversible addition-fragmentation chain transfer agent is S-benzyl-S' propyl trithiocarbonate or S—S' dibenzyl trithiocarbonate.

Preferably, in Step A, the concentration of the polymerizable monomer is 0.05-2 g/ml relative to the total volume of the polymerizable monomer and the liquid carbon dioxide, and the weight ratio of photoinitiator to stabilizing dispersant to polymerizable monomer is (1-3):(5-15):100.

Preferably, in Step A, the polymerizable monomer is vinyl monomer, acrylate ester monomer or methacrylate ester monomer.

Further preferably, the vinyl monomer is vinyl acetate, styrene, acrylic acid, methacrylic acid, itaconic acid, dibutyl maleate, dioctyl maleate, acrylamide, methacryl amide or acrylonitrile; the acrylate ester monomer is methyl acrylate, ethyl acrylate, isobornyl acrylate, butyl acrylate, lauryl acrylate, 2-hydroxyethyl acrylate, glycidyl acrylate, isobutyl acrylate, isodecyl acrylate, isooctyl acrylate or 2-hydroxypropyl acrylate; the methacrylate ester monomer is methyl methacrylate, ethyl methacrylate, isobornyl methacrylate, butyl methacrylate, lauryl methacrylate, 2-hydroxyethyl methacrylate, glycidyl methacrylate, isobutyl methacrylate, isodecyl methacrylate, isooctyl methacrylate, dimethylamino ethyl methacrylate or 2-hydroxypropyl methacrylate.

Preferably, in Step A, the photoinitiator is 2-hydroxy-2-methyl-1-phenylacetone-1,1-hydroxy-cyclohexyl benzene ketone, 2,4,6-trimethyl benzoyl diphenyl phosphine oxide, dibenzoyl phenyl phosphine oxide or 2-methyl-1-[4-methylthiophenyl]-2-morpholine acetone-1,2-phenyl-2-dimethylamino-1-(4-morpholinylphenyl)-butanone-1.

Preferably, in Step A, the photoinitiation reaction is conducted at the temperature of 0-20° C.

Further preferably, in Step A, the initiating light source has an irradiation wavelength of 300 nm-500 nm, and a light intensity of 0.5-100 mW/cm$^2$.

Preferably, the initiating light source has an irradiation wavelength of 365 nm-410 nm, and a light intensity of 1-10 mW/cm$^2$.

Work principle of the present invention: one key point of the present invention lies in using a radical photoinitiator to initiate polymerization, so that the reaction can be conducted without heating, to make it happen that the liquid carbon dioxide can be used as the reaction medium, greatly reducing the reaction pressure. Another key point of the present invention lies in using a fluorine-containing macromolecular active chain as the stabilizing dispersant. In dispersion polymerizations, the role of stabilizing dispersants is to stabilize polymer particles and prevent them from mutual coagulation by anchoring one end of the dispersants to the polymer particles and allowing the other end thereof, because of its affinity with reaction mediums, to stretch into the reaction mediums. Structures of stabilizing dispersants mainly include block copolymers, random copolymers, macromolecular initiators, macromolecular monomers, etc. In the dispersion polymerizations with supercritical carbon dioxide as the medium, their stabilizing dispersants usually have a fluorine-containing or siloxane-containing molecular chain as a $CO_2$-philic molecular chain unit. In the study on technologies related to the present invention, it is found that all attempts at preparing polymer microspheres by using a fluorine-containing or silicon-containing block or random copolymer as the stabilizing dispersant have failed; the reason lies in the issue of solubility of the stabilizing dispersants. When liquid carbon dioxide is used as the medium, the liquid carbon dioxide has a poor affinity with common macromolecular chains due to the reaction conditions of low temperature and low pressure, and once the copolymer contains a relatively large number of the $CO_2$-phobic structure units (i.e., the molecular chains having affinity with and thus being apt to anchoring onto polymer particles), its solubility in carbon dioxide will decrease sharply, making it hard to effectively stabilize polymer particles. In view of this situation, the present invention synthesizes a fluorine-containing polymer chain with an RAFT-active end group, which is then used as the stabilizing dispersant in photo dispersion polymerization with liquid carbon dioxide as the medium. This fluorine-containing polymer chain contains none or few of other polymer units, and therefore has a good solubility in liquid carbon dioxide. Upon initiation of a polymerization reaction, polymerization occurs on the active RAFT groups at the ends of the fluorine-containing polymer chains to generate block molecular chains as units for anchoring polymer particles. This process is equivalent to an in-situ immediate formation of the block copolymers as the stabilizing dispersants, similar to the case where macromolecular monomer or macromolecular photoinitiator is used as stabilizing dispersant. In principle, all dispersion polymerizations in general can use as stabilizing dispersants such active macromolecules containing an RAFT end group. However, the RAFT group has a function of slowing the polymerization reaction and thus interfering with the nucleation process, making it hard to form polymer microspheres. In a dispersion polymerization involving an RAFT process, to ensure the generation of desirable polymer microspheres, a two-step method is generally used, that is, the RAFT component is not added until the nucleation period is over. The shortcoming of this method is that it makes the synthesis process more complicate, which is more distinct in reactions occurring in high-pressure, closed reactors. According to the present invention, a photoinitiation polymerization technique is used, and its rapid initiation of polymerization process happens to avoid the RAFT units from slowing the nucleation period. Therefore, there is no need to wait for the end of the nucleation period before adding the RAFT component, and instead, all the components are added at the same time. Excellent polymer microspheres are obtained by this one-step method within a relatively short time. On the other hand, when a thermal initiator is simply replaced by a photoinitiator in dispersion polymerization, the reaction becomes so fast that the molecular chains tend to rapidly precipitate out, and a lot of tiny polymer particles (nucleuses) formed agglomerate together because there is no sufficient time for them to absorb the stabilizing dispersants, thus being prejudicial to the formation of microspheres. However, the very existence of the RAFT units slowing the polymerization reaction just avoids the above situation of over-rapid nucleation caused by fast photo-polymerization. In conclusion, the use of a fluorine-containing, active molecular chain with an RAFT end group, as a stabilizing dispersant, solves the solubility issue of the stabilizing dispersants in liquid carbon dioxide under the conditions of low temperature and low pressure, and also the issue of over-rapid nucleation in photo-dispersion polymerization; and the use of the photoinitiation polymerization technique, on the one hand, enables a polymerization reaction at a temperature lower than the critical temperature of carbon dioxide and thus achieves using liquid carbon dioxide as the reaction medium, and on the other hand, thanks to its rapid reaction characteristic, solves the issue with traditional thermal dispersion polymerizations where the existence of the RAFT units interferes with the nucleation period and thus is prejudicial to the formation of microspheres.

Compared to the prior art, the present invention has the following benefits and advantages.

1. The present invention introduces a photoinitiation technique into the dispersion polymerization using carbon dioxide as the medium. Since photoinitiation can be carried out at a low temperature, the reaction temperature can be lower than the critical temperature of carbon dioxide, such as 0° C.-30° C. Accordingly, carbon dioxide may be in a liquid state, which to a great extent reduces the pressure on the carbon dioxide system, and shortens the time of polymerization reaction. As a result, the manufacturing cost of high-pressure reaction equipment can be significantly reduced and the production efficiency improved, accomplishing a new rapid, green and energy-efficient method for preparing microspheres.

2. The present invention uses a fluorine-containing polymer as a stabilizer for dispersion polymerization, which anchors upon and covers the surface of the formed microsphere. The coverage of the microsphere's surface with the fluorine-containing polymer can reduce the surface energy thereof, facilitating timely migration of microsphere to coating surface.

3. Further, the present invention introduces a tertiary amine group into the fluorine-containing polymer chain. The tertiary amine groups may be stripped of hydrogen atoms in a photocuring process to form free radicals and thus take part in the photocuring process, enabling the microsphere to be firmly bonded in a cross-linked network, wherein the tight bonding of the microsphere with the coating helps to fully exercise its performance and ensures the stability of the cured coating; in addition, the tertiary amines on the surface of microsphere also endow acid-sensitivity of microsphere and can be applied in other areas.

4. The present invention uses a reversible addition-fragmentation chain transfer (RAFT) active radical polymerization method to synthesize the stabilizer containing fluorine and tertiary amine groups, and thus the microsphere obtained also has an RAFT active group on its surface, and this type of group can participate in the radical polymerization process, further anchoring the microsphere firmly onto the coating film.

BRIEF DESCRIPTION OF THE DRAWINGS

The following detailed depiction of non-limiting examples by referring to the accompanying drawings below shall render other features, aims and advantages of the present invention more prominent.

DETAILED DESCRIPTION

Figure 1:
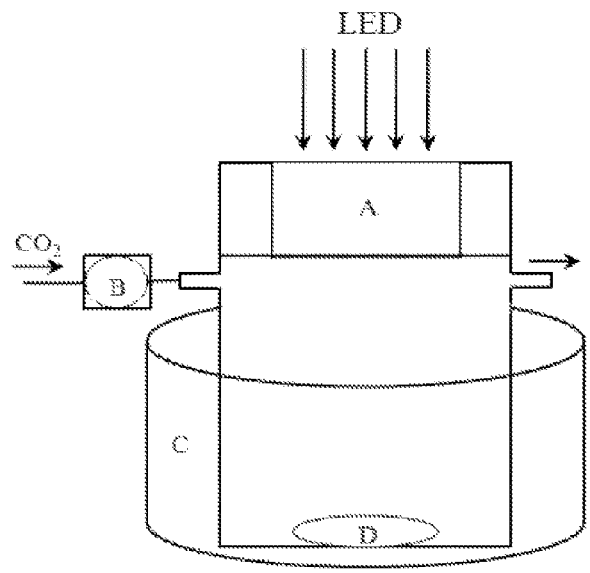
FIG. 1 shows a schematic diagram of a reaction device.

Hereinafter follows a detailed discussion of the present invention by specific examples and accompanying drawings. The following examples will assist those skilled in the art in further understanding of the present invention without limiting it in any form. It should be noted that those skilled in the art could still make some variations and improvements without departing from the conception of the invention, which shall also fall within the scope of protection of the present invention.

The photoinitiated dispersion polymerization according to the present invention is conducted in a closed pressure container. The withstand voltage of the container depends on actual working pressure (such as 36 bars). The irradiation light for initiating polymerization may enter the reaction container through a light-permeable window of the container, or a light source may be placed in the container. The reaction device is similar to traditional reaction devices that have a light-permeable window and use supercritical carbon dioxide as medium, but its withstand voltage can be significantly lower than that of those devices.

In the photoinitiated dispersion polymerization according to the present invention, the initiation light source used is ultraviolet light or visible light, with a wavelength adjustable within the range of 300 nm-500 nm, preferably, an irradiation wavelength of 365 nm-410 nm. The light source device may be a high-pressure mercury lamp, a metal halide lamp, an electrodeless lamp, a luminous diode (LED), etc. The light intensity of the light source may be adjusted from 0.5 to 100 mW/cm$^2$, preferably from 1 to 10 mW/cm$^2$.

In the photoinitiated dispersion polymerization according to the present invention, the reaction medium used is liquid carbon dioxide. To ensure that carbon dioxide is in a liquid state, the reaction temperature must be below the critical temperature of carbon dioxide (31.3° C.). The reaction temperature may be −20° C. to 30° C., preferably 0-20° C. There is no special requirement for the reaction pressure except for ensuring the liquid state of carbon dioxide at the reaction temperature. The reaction pressure is preferably 20-70 bars.

In the photoinitiated dispersion polymerization according to the present invention, the photoinitiator used is an industrially universal photoinitiator, and preferably is 2-hydroxy-2-methyl-1-phenylacetone-1 (trade name: Darocur 1173), 1-hydroxy-cyclohexylbenzeneketone (trade name: Irgacure 184), 2,4,6-trimethyl benzoyl diphenyl phosphine oxide (trade name: TPO), dibenzoyl phenyl phosphine oxide (trade name: Irgacure 819), 2-methyl-1-[4-methylthiophenyl]-2-morpholineacetone-1 (trade name: Irgacure 907), 2-phenyl-2-dimethylamino-1-(4-morpholino-phenyl)-butanone-1 (Irgacure 369), etc. The amount of the photoinitiator used may be adjusted from 0.3 to 10 wt % (with respect to monomer; the same applies below), preferably 1-3 wt %.

In the photoinitiated dispersion polymerization according to the present invention, the polymerizable monomer used is a general radical polymerizable monomer, the examples thereof including vinyl monomer, acrylate ester monomer, and methacrylate ester monomer. Preferable examples of the monomers include methyl acrylate, methyl methacrylate, ethyl acrylate, ethyl methacrylate, isobornyl acrylate, isobornyl methacrylate, butyl acrylate, butyl methacrylate, lauryl acrylate, lauryl methacrylate, vinyl acetate, styrene, acrylic acid, methacrylic acid, 2-hydroxyethyl acrylate, 2-hydroxyethyl methacrylate, glycidyl acrylate, glycidyl methacrylate, isobutyl acrylate, isobutyl methacrylate, isodecyl acrylate, isodecyl methacrylate, isooctyl acrylate, isooctyl methacrylate, 2-dimethylamino ethyl methacrylate, 2-hydroxypropyl acrylate, 2-hydroxypropyl methacrylate, itaconic acid, dibutyl maleate, dioctyl maleate, acrylamide, methacryl amide, or acrylonitrile, etc. The feed concentration of the monomers (namely the concentration of the polymerizable monomers relative to the total volume of the polymerizable monomers and liquid carbon dioxide) may be adjusted between 0.02 and 2 g/ml, preferably, between 0.05 and 0.2 g/ml.

In order for microspheres formed in dispersion polymerization to disperse stably and meanwhile, to enable the surface of the microspheres to contain desired fluorocarbon chain, amine group and controlled polymerization active group, a stabilizing dispersant is synthesized according to the present invention. This stabilizing dispersant is obtained through random copolymerization of dodecafluoroheptyl methacrylate (HFPMA) and dimethylaminoethyl methacrylate (DMAEMA) in the presence of a reversible addition-fragmentation chain transfer agent (RAFT reagent). In principle, there is no special requirement for the RAFT reagent, which is a general, common RAFT reagent, and preferably is S-benzyl-S' propyl trithiocarbonate (BPTTC), or S—S' dibenzyl trithiocarbonate (DBTTC). The reaction for synthesizing the stabilizing dispersant is a free-radical polymerization reaction. The amount of the stabilizing dispersant used may be adjusted from 1 to 20 wt % (with respect to monomer, the same applies below), preferably 5 to 15 wt %.

The photoinitiated dispersion polymerization according to the present invention is implemented in the following steps:

a polymerizable monomer, a photoinitiator and a stabilizing dispersant are added in a reactor, respectively. A process of feeding and slowly discharging a little carbon dioxide gas is conducted for three times continuously so as to eliminate air in the reactor. Liquid carbon dioxide is injected into the reactor with a high pressure gas bottle or other supply device of carbon dioxide, and when the temperature and pressure in the reactor becomes substantially constant after 10-30 minutes, the light source is switched on, and thus the reaction begins. After light irradiation of 0.5-5 h, the reaction is over, the temperature of the reactor is allowed to return to room temperature, and the resulting polymer is allowed to precipitate onto the bottom of the reactor. Then, the polymer is washed with liquid carbon dioxide to remove residual polymerizable monomers which might be present in a small amount.

Example 1

This example describes an instance of synthesizing the stabilizing dispersant used in the present invention. Azodiisobutyronitrile (AIBN) thermal initiator (0.04 g, 0.00025 mol), BPTTC (0.24 g, 0.0010 mol) and two polymerizable monomers with different proportions (15.3 g in total, see Table 1 for their feed ratio) were dissolved in 10 ml of benzotrifluoride, and were heated to 60° C. under nitrogen for random copolymerization for 48 hours. The polymer was precipitated from the solution with methanol, filtered and dried in a vacuum oven at 45° C. for 24 hours.

TABLE 1

Monomer composition ratio and number-average molecular weight ($M_n$) of random copolymer

| | | HFPMA: first monomer | | | |
|---|---|---|---|---|---|
| Dispersant Code | Second monomer | Monomer feed ratio | Monomer composition ratio | $M_n$/g mol$^{-1}$ | Application example |
| S-BA | BA | 90:10 | 88:12 | 17000 | Comparison Example 1 |
| S-DM-1 | DMAEMA | 95:5 | 95:5 | 16500 | Example 2 |
| S-DM-2 | DMAEMA | 90:10 | 90:10 | 15300 | Examples 3, 5 and 6 |
| S-DM-3 | DMAEMA | 85:15 | 84:16 | 17600 | Example 4 |

In Table 1, in the column of the second monomer, BA refers to butyl acrylate, and DMAEMA refers to dimethylaminoethyl methacrylate; the first monomer is dodecafluoroheptyl methacrylate (HFPMA); the monomer feed ratio refers to the weight ratio of the first monomer to the second monomer; the monomer composition ratio refers to the weight ratio of the first monomer to the second monomer in the resulting copolymer.

In this example, the weight ratio of the first monomer to the second monomer is not limited to those illustrated in Table 1, and may be any value within 40:60-99:1.

Example 2

Figure 2:
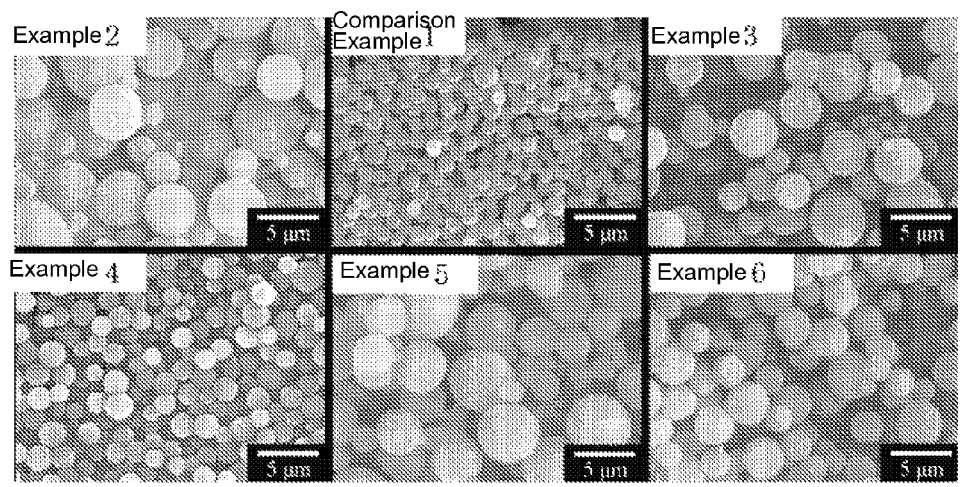
FIG. 2 shows images of electronic scanning microscope (SEM) of polymer microspheres obtained in Comparison Example 1 and Examples 2-6.

The fluorine-containing polymer microsphere in this example was prepared by the following steps: A photoinitiated dispersion polymerization reaction was carried out in a high-pressure reactor of 40 ml (as shown in FIG. 1), wherein silica glass on the top of the high-pressure reactor was used as a light-permeable window and LED of 3 W (wavelength range: 405-410 nm) was used as the light source. The reactor was placed in an ice-water bath and equipped with a magnetic stirrer beneath. Isobornyl acrylate (IBOA) as the polymerizable monomer, 2,4,6-trimethylbenzoyl diphenyl phosphine oxide (TPO) as the photoinitiator and S-DM-1 as the stabilizing dispersant were respectively added into the reactor. The concentration of the polymerizable monomer IBOA was 0.10 g/ml relative to the total volume of the polymerizable monomer and the liquid carbon dioxide, and the amount of photoinitiator TPO used was 2.0 wt % of the polymerizable monomer, and the amount of the stabilizing dispersant S-DM-1 used was 7 wt % of the polymerizable monomer. A small amount of carbon dioxide gas was pumped in and then slowly discharged, the process repeated for three times so as to eliminate air in the reactor. Liquid carbon dioxide was injected into the reactor via a high-pressure gas bottle, and the total volume of the solution was constantly kept at 32 ml. After 20 minutes, the temperature of the reactor became basically constant (0° C.), and the reaction pressure was about 35 bars. Then, the light source was switched on and the reaction began. After 1.5 hours of light irradiation, the reaction was over, and the temperature of the reactor was elevated to room temperature. The resulting polymer was precipitated onto the bottom of the reactor, and then was washed with liquid carbon dioxide to remove a small amount of residual polymerizable monomers. The product finally obtained was dry, white powder. The SEM image of the resultant is shown in FIG. 2. As shown in FIG. 2, the obtained polymer product is in the shape of regular sphere, and there is no obvious adhesion among microspheres, which have particle sizes substantially ranging from 1 to 10 μm and are suitable for additives for coating products.

Comparison Example 1

Figure 3:
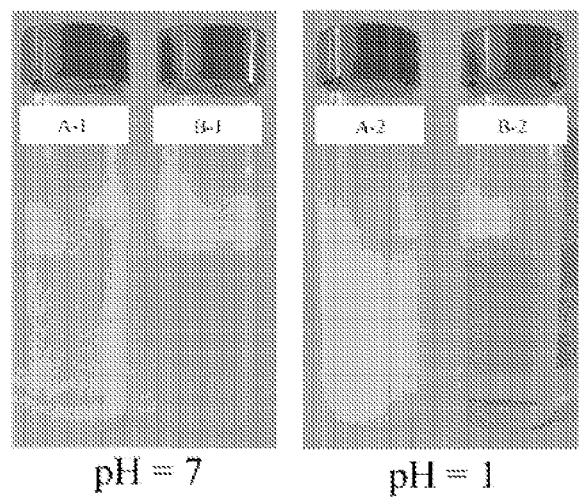
FIG. 3 shows a comparison diagram of dispersion characteristics of polymer microspheres obtained in Comparison Example 1 and Example 2 in water with different pH values.

In comparison, this comparison example used a stabilizing dispersant S-BA, not containing amino group, to replace S-DM-1 in Example 2 in the same amount, with the type and amount of the rest of reagents and the implementing process remaining the same as those in Example 2. The SEM image of the resultant is illustrated in FIG. 2. As shown in FIG. 2, the obtained polymer product is in the shape of regular spheres, and there is no obvious adhesion among microspheres, which have particle sizes substantially ranging from 1 to 5 μm. However, the type of the microspheres contains no amino group on the surface thereof, and therefore, has no pH sensitivity. FIG. 3 compares the microspheres in Comparison Example 1 with those in Example 2 in terms of their dispersion characteristic in water with different pH values, with A-1/A-2 corresponding to Example 2 and B-1/B-2 corresponding to Comparison Example 1; it is clear that under an acid environment (pH=1), the microspheres obtained in Example 2 disperse well into water, whereas the microspheres obtained in Comparison Example 1 float on the water surface; this is due to the fact that the microspheres obtained in Example 2 contain amino groups, which forms quaternary ammonium cations under an acid condition, thus enhancing hydrophilicity of the microspheres.

Example 3

This example used a stabilizing dispersant S-DM-2 to substitute for S-DM-1 in Example 2, with the type and amount of the rest of reagents and the implementing process remaining the same as those in Example 2. The SEM image of the resultant is illustrated in FIG. 2. As shown in FIG. 2, the obtained polymer product is in the shape of regular sphere, and there is no obvious adhesion among microspheres, which have particle sizes substantially ranging from 1 to 10 μm and are suitable for additives for coating products.

Example 4

This example used a stabilizing dispersant S-DM-3 to substitute for S-DM-1 in Example 2, with the type and amount of the rest of reagents and the implementing process remaining the same as those in Example 2. The SEM image of the resultant is illustrated in FIG. 2. As shown in FIG. 2, the obtained polymer product is in the shape of regular sphere, and there is no obvious adhesion among microspheres, which have particle sizes substantially ranging from 1 to 10 μm and are suitable for additives for coating products.

Example 5

The example used the stabilizing dispersant S-DM-2 in the amount of 5 wt % (with respect to the polymerizable monomer), with the type and amount of the rest of reagents and the implementing process remaining the same as those in Example 3. The SEM image of the resultant is illustrated in FIG. 2. As shown in FIG. 2, the obtained polymer product is in the shape of regular sphere, and there is no obvious adhesion among microspheres, which have particle sizes substantially ranging from 1 to 10 μm and are suitable for additives for coating products.

Example 6

The example used the stabilizing dispersant S-DM-2 in the amount of 10 wt % (with respect to the polymerizable monomer), with the type and amount of the rest of reagents and the implementing process remaining the same as those in Example 3. The SEM image of the resultant is illustrated in FIG. 2. As shown in FIG. 2, the obtained polymer product is in the shape of regular sphere, and there is no obvious adhesion among microspheres, which have particle sizes substantially ranging from 1 to 10 μm and are suitable for additives for coating products.

By a comparison among Examples 2, 3 and 4, it can be found that the particle size of microsphere obtained decreases as the monomer proportion of DMAEMA in the stabilizing dispersant rises. By a comparison among Examples 5, 3 and 6, it can be found that the particle size of the microsphere obtained decreases as the usage amount of the stabilizing dispersant rises. This phenomenon fully demonstrates that the method according to the present invention can conveniently adjust the size of the microsphere.

Example 7

In this example, the usage amount of the stabilizing dispersant S-DM-2 was 1.5 wt % (with respect to the polymerizable monomer), while the type and amount of the rest of reagents and the implementing process remain the same as those in Example 3.

Example 8

In this example, the usage amount of the stabilizing dispersant S-DM-2 was 3 wt % (with respect to the polymerizable monomer), while the type and amount of the rest of reagents and the implementing process remain the same as those in Example 3.

By a comparison among Examples 5, 6, 7 and 8, the influence of the dispersant concentration on the morphology of the polymer is shown in Table 2.

TABLE 2

Influence of dispersant concentration on polymer morphology

| Usage amount of dispersant (%) | S-DM-2 Morphology | $D_n$ (μm) |
|---|---|---|
| 1.5 | Lump | — |
| 3.0 | microsphere | 3.54 |
| 5.0 | microsphere | 3.61 |
| 10.0 | microsphere | 2.60 |

Example 9

Figure 4:
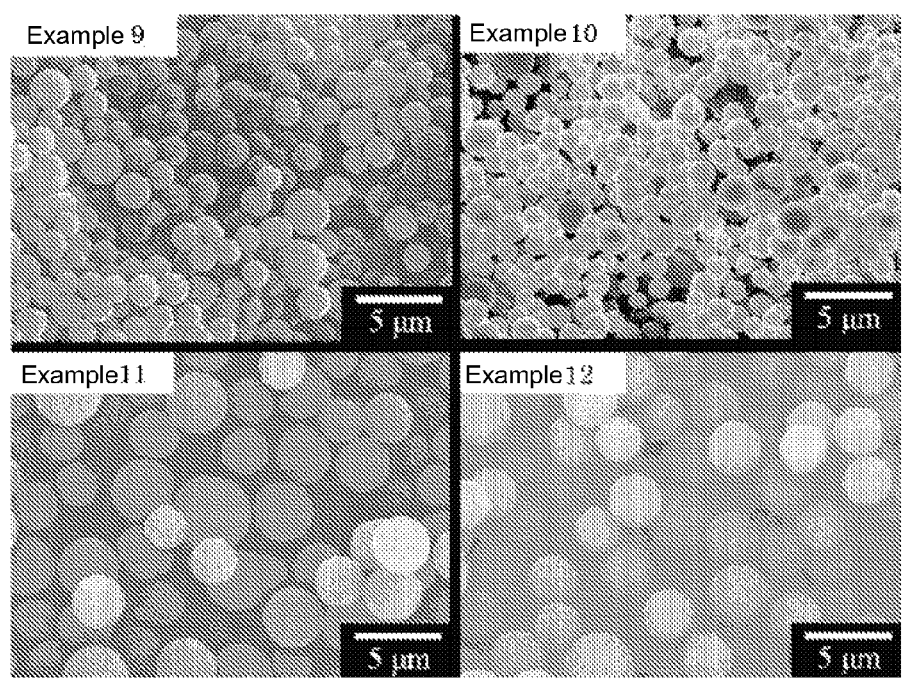
FIG. 4 shows images of electronic scanning microscope (SEM) of polymer microspheres obtained in Examples 9-12; wherein, A is silica glass, B is pressure gage, C is ice-water bath, and D is a magnetic stirrer.

The fluorine-containing polymer microspheres in this example were prepared by the following steps: A photoinitiated dispersion polymerization reaction was carried out in a high-pressure reactor of 40 ml (as shown in FIG. 1), wherein silica glass on the top of the high-pressure reactor was used as a light-permeable window and LED of 3 W (wavelength range: 405-410 nm) was used as the light source. The reactor was placed in an ice-water bath and equipped with a magnetic stirrer beneath. The polymerizable monomer acrylamide, the photoinitiator Irgacure 819 and the stabilizing dispersant S-DM-2 were respectively added into the reactor. The concentration of the polymerizable monomer was 0.02 g/ml relative to the total volume of the polymerizable monomer and the liquid carbon dioxide, and the amount of photoinitiator used was 0.3 wt % of the polymerization polymer, and the usage amount of the stabilizing dispersant was 2 wt % of the polymerizable monomer. A small amount of carbon dioxide gas was pumped in and then slowly discharged, the process repeated for three times so as to eliminate air in the reactor. Liquid carbon dioxide was injected into the reactor via a high-pressure gas bottle, and the total volume of the solution was constantly kept at 32 ml. After 20 minutes, the temperature of the reactor became basically constant (−20° C.), and the reaction pressure was about 20 bars. Then, the light source was switched on and the reaction began. After 5 hours of light irradiation, the reaction was over, and the temperature of the reactor was elevated to room temperature. The polymer was precipitated onto the bottom of the reactor, and then was washed with liquid carbon dioxide to remove a small amount of residual polymerizable monomers. The product finally obtained was dry, white powder. The SEM image of the resultant is illustrated in FIG. 4. As shown in FIG. 4, the obtained polymer product is in the shape of regular sphere, and there is no obvious adhesion among microspheres, which have particle sizes substantially ranging from 1 to 10 μm and are suitable for additives for coating products.

Example 10

The fluorine-containing polymer microspheres in this example were prepared in the same way as in Example 9, except for the following differences:

The polymerizable monomer was isobutyl methacrylate, the photoinitiator was Darocur 1173, and the stabilizing dispersant was S-DM-1; wherein the concentration of the polymerizable monomer was 2.0 g/ml relative to the total volume of the polymerizable monomer and the liquid carbon dioxide, the amount of the photoinitiator used was 10 wt % of the polymerization polymer, and the usage amount of the stabilizing dispersant was 20 wt % of the polymerizable monomer.

The temperature of the reactor was basically constant (30° C.), the reaction pressure was about 70 bars, and the irradiation reaction time was 0.5 hour. The SEM image of the resultant is illustrated in FIG. 4. As shown in FIG. 4, the obtained polymer product is in the shape of regular sphere, and there is no obvious adhesion among microspheres, which have particle sizes substantially ranging from 1 to 10 µm and are suitable for additives for coating products.

Example 11

The fluorine-containing polymer microspheres in this example were prepared in the same way as in Example 9, except for the following differences:

The polymerizable monomer was lauryl methacrylate, the photoinitiator was Irgacure 184, and the stabilizing dispersant was S-DM-3; wherein The concentration of the polymerizable monomer was 0.05 g/ml relative to the total volume of the polymerizable monomer and the liquid carbon dioxide, the amount of the photoinitiator used was 1.0 wt % of the polymerization polymer, and the usage amount of the stabilizing dispersant was 5.0 wt % of the polymerizable monomer.

The temperature of the reactor was basically constant (10° C.), the reaction pressure was about 45 bars, and the irradiation reaction time was 3 hours. The SEM image of the resultant is illustrated in FIG. 4. As shown in FIG. 4, the obtained polymer product is in the shape of regular sphere, and there is no obvious adhesion among microspheres, which have particle sizes substantially ranging from 1 to 10 µm and are suitable for additives for coating products.

Example 12

The fluorine-containing polymer microspheres in this example were prepared in the same way as in Example 9, except for the following differences:

The polymerizable monomer was isobutyl acrylate, the photoinitiator was Irgacure 369, and the stabilizing dispersant was S-DM-2; wherein the concentration of the polymerizable monomer was 0.15 g/ml relative to the total volume of the polymerizable monomer and the liquid carbon dioxide, the amount of photoinitiator used was 3.0 wt % of the polymerization polymer, and the usage amount of stabilizing dispersant was 15 wt % of the polymerizable monomer.

The temperature of the reactor was basically constant (20° C.), the reaction pressure was about 58 bars, and the irradiation reaction time was 1.5 hours. The SEM image of the resultant is illustrated in FIG. 4. As shown in FIG. 4, the obtained polymer product is in the shape of regular sphere, and there is no obvious adhesion among microspheres, which have particle sizes substantially ranging from 1 to 10 µm and are suitable for additives for coating products.

Example 13

In this example, the fluorine-containing polymer microsphere prepared in Example 2 was added to an ordinary ultraviolet-curable coating. The cured coating surface of this ultraviolet-curable coating was measured to be in a contact angle of 55° with water, and had a surface energy of 49.36 mJ/m$^2$. After the fluorine-containing polymer microsphere prepared in Example 2 was added in the amount of 5.0 wt % to the above ultraviolet-curable coating and uniformly mixed, ultraviolet curing was conducted, and the cured coating surface thereof was measured to be in a contact angle of 82° with water and had a surface energy of 30.56 mJ/m$^2$. After the cured coating had been immersed in acetone for one hour, The angle was measured to be 86°, and the surface energy was 31.13 mJ/m$^2$. This result shows that the use of such fluorine-containing polymer microspheres in the material of coating can reduce the surface energy of the coating significantly. In addition, the microspheres are closely combined with the coating and not inclined to fall off.

The specific examples of the present invention have been depicted above. It shall be appreciated that the present invention is not limited to the above specific embodiments. Those skilled in the art could make different variations or amendments within the scope of the claims, which will not influence the substantive contents of the present invention.

What is claimed is:

1. A fluorine-containing polymer microsphere, wherein the polymer microsphere is prepared by a method comprising the following steps:
    A. adding a mixture of a polymerizable monomer, a photoinitiator and a fluorine-containing stabilizing dispersant into a reactor, introducing carbon dioxide gas into the reactor to eliminate air therein; injecting liquid carbon dioxide into the reactor, and after the temperature and pressure in the reactor is constant, using an initiating light source to irradiate the mixture inside the reactor so as to carry out a photoinitiation reaction for 0.5-5 hours at a temperature of −20 to 30° C. and under a pressure of 20-70 bars; wherein the concentration of the polymerizable monomer is 0.02-2 g/ml relative to the total volume of the polymerizable monomer and the liquid carbon dioxide, and the weight ratio of the photoinitiator to the stabilizing dispersant to the polymerizable monomer is (0.3-10): (2-20):100; and
    B. after the reaction is over and the temperature in the reactor returns to room temperature, washing precipitates with liquid carbon dioxide, thereby obtaining the polymer microsphere, wherein the fluorine-containing stabilizing dispersant is obtained through a polymerization reaction of dodecafluoroheptyl methacrylate and dimethylaminoethyl methacrylate in the presence of a reversible addition-fragmentation chain transfer agent, wherein the reversible addition-fragmentation chain transfer agent is S-benzyl-S' propyl trithiocarbonate or S—S' dibenzyl trithiocarbonate; and the weight ratio of the dodecafluoroheptyl methacrylate to the dimethylaminoethyl methacrylate is 40:60-99:1; and wherein in step A, the initiating light source has an irradiation wavelength of 300 nm-500 nm, and a light intensity of 0.5-100 mW/cm$^2$.

2. The fluorine-containing polymer microsphere according to claim 1, wherein in step A, the concentration of the polymerizable monomer was 0.05-2 g/ml relative to the total volume of the polymerizable monomer and the liquid carbon dioxide, and the weight ratio of the photoinitiator to the stabilizing dispersant to the polymerizable monomer is (1-3): (5-15):100.

3. The fluorine-containing polymer microsphere according to claim 1, wherein in step A, the polymerizable monomer is vinyl monomer, acrylate ester monomer or methacrylate ester monomer; the vinyl monomer is vinyl acetate, styrene, acrylic acid, methacrylic acid, itaconic acid, dibutyl maleate, dioctyl maleate, acrylamide, methacryl amide or acrylonitrile; the acrylate ester monomer is methyl acrylate, ethyl acrylate, isobornyl acrylate, butyl acrylate, lauryl acrylate, 2-hydroxyethyl acrylate, glycidyl acrylate, isobutyl acrylate, isodecyl acrylate, isooctyl acrylate or 2-hydroxypropyl acrylate; the methacrylate ester monomer is methyl methacrylate, ethyl methacrylate, isobornyl methacrylate, butyl methacrylate, lauryl methacrylate, 2-hydroxyethyl methacrylate, glycidyl methacrylate, isobutyl methacrylate, isodecyl methacrylate, isooctyl methacrylate, dimethylamino ethyl methacrylate or 2-hydroxypropyl methacrylate.

4. The fluorine-containing polymer microsphere according to claim 1, wherein in step A, the photoinitiator is 2-hydroxy-2-methyl-1-phenylacetone-1, 1-hydroxy-cyclohexyl benzene ketone, 2,4,6-trimethyl benzoyl diphenyl phosphine oxide, dibenzoyl phenyl phosphine oxide or 2-methyl-1-[4-methylthiophenyl]-2-morpholine acetone-1, 2-phenyl-2-dimethylamino-1-(4-morpholinylphenyl)-butanone-1.

5. The fluorine-containing polymer microsphere according to claim 1, wherein in step A, the photoinitiation reaction is conducted at the temperature of 0-20° C.

6. The fluorine-containing polymer microsphere according to claim 1, wherein the initiating light source has an irradiation wavelength of 365 nm-410 nm, and a light intensity of 1-10 mW/cm$^2$.

7. The fluorine-containing polymer microsphere according to claim 3, wherein in step A, the concentration of the polymerizable monomer was 0.05-2 g/ml relative to the total volume of the polymerizable monomer and the liquid carbon dioxide, and the weight ratio of the photoinitiator to the stabilizing dispersant to the polymerizable monomer is (1-3): (5-15):100.

8. The fluorine-containing polymer microsphere according to claim 3, wherein in step A, the polymerizable monomer is vinyl monomer, acrylate ester monomer or methacrylate ester monomer; the vinyl monomer is vinyl acetate, styrene, acrylic acid, methacrylic acid, itaconic acid, dibutyl maleate, dioctyl maleate, acrylamide, methacryl amide or acrylonitrile; the acrylate ester monomer is methyl acrylate, ethyl acrylate, isobornyl acrylate, butyl acrylate, lauryl acrylate, 2-hydroxyethyl acrylate, glycidyl acrylate, isobutyl acrylate, isodecyl acrylate, isooctyl acrylate or 2-hydroxypropyl acrylate; the methacrylate ester monomer is methyl methacrylate, ethyl methacrylate, isobornyl methacrylate, butyl methacrylate, lauryl methacrylate, 2-hydroxyethyl methacrylate, glycidyl methacrylate, isobutyl methacrylate, isodecyl methacrylate, isooctyl methacrylate, dimethylamino ethyl methacrylate or 2-hydroxypropyl methacrylate.

9. The fluorine-containing polymer microsphere according to claim 1, wherein in step A, the photoinitiator is 2-hydroxy-2-methyl-1-phenylacetone-1, 1-hydroxy-cyclohexyl benzene ketone, 2,4,6-trimethyl benzoyl diphenyl phosphine oxide, dibenzoyl phenyl phosphine oxide or 2-methyl-1-[4-methylthiophenyl]-2-morpholine acetone-1, 2-phenyl-2-dimethylamino-1-(4-morpholinylphenyl)-butanone-1.

10. The fluorine-containing polymer microsphere according to claim 1, wherein in step A, the photoinitiation reaction is conducted at the temperature of 0-20° C.

* * * * *